(12) United States Patent
Campbell et al.

(10) Patent No.: US 8,236,219 B2
(45) Date of Patent: Aug. 7, 2012

(54) RESIN INFUSION POTTING

(75) Inventors: Richard V. Campbell, Tallahassee, FL (US); Kevin J. Barefield, Opelika, AL (US)

(73) Assignee: Bright Technologies, Inc., Havana, FL (US)

( * ) Notice: Subject to any disclaimer, the term of this patent is extended or adjusted under 35 U.S.C. 154(b) by 226 days.

(21) Appl. No.: 12/658,925

(22) Filed: Feb. 17, 2010

(65) Prior Publication Data

US 2010/0187721 A1 Jul. 29, 2010

Related U.S. Application Data

(63) Continuation-in-part of application No. 12/378,505, filed on Feb. 17, 2009, now Pat. No. 8,048,357, which is a continuation-in-part of application No. 10/734,564, filed on Dec. 12, 2003, now abandoned.

(51) Int. Cl.
*B29C 45/14* (2006.01)

(52) U.S. Cl. ............ 264/261; 264/263; 264/271.1; 264/275

(58) Field of Classification Search ............ None
See application file for complete search history.

(56) References Cited

U.S. PATENT DOCUMENTS

| | | | | |
|---|---|---|---|---|
| 2,177,567 | A * | 10/1939 | Imbault | 164/100 |
| 4,121,395 | A * | 10/1978 | Rudolf | 52/223.13 |
| 7,076,853 | B2 * | 7/2006 | Campbell | 29/458 |

* cited by examiner

*Primary Examiner* — Edmund H. Lee
(74) *Attorney, Agent, or Firm* — J. Wiley Horton (57) ABSTRACT

A process for forcibly infusing liquid potting compound into the strands of a cable in order to attach an anchor to the cable. The process uses a strand cavity within an anchor that encloses the exposed strands. The strand cavity is sealed. Liquid potting compound is then forced into the strand cavity, where it runs around and through the exposed strands. A second venting passage is preferably employed, so that the liquid potting compound flows through the mold without trapping any substantial air pockets.

7 Claims, 13 Drawing Sheets

RESIN INFUSION POTTING

CROSS-REFERENCES TO RELATED APPLICATION

This application is a continuation-in-part of U.S. patent application Ser. No. 12/378,505, which was filed on Feb. 17, 2009 now U.S. Pat. No. 8,048,357 and which was itself a continuation-in-part of U.S. patent application Ser. No. 10/730,564 which was filed Dec. 12, 2003, now abandoned.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

This invention relates to the field of cables and ropes. More specifically, the invention comprises a process for thoroughly infusing liquid potting compound into the strands of a rope or cable in order to affix an anchor.

2. Description of the Related Art

Devices for mounting a termination on the end of a rope or cable are disclosed in detail in U.S. Pat. No. 7,237,336 to Campbell, which is incorporated herein by reference. Throughout this disclosure, the term "strand" will be used to describe the constituents of synthetic cables, natural-fiber cables, and ropes. Although synthetic cables are used for the illustrations, the reader should understand that the methods and devices disclosed are equally applicable to any type of stranded cable.

It is often useful to affix a piece of hardware to the end of a cable. Examples of hardware would be threaded fasteners, hooks, and eyes. Such hardware will be generically referred to as an "anchor." Anchors typically have an expanding internal passage or some type of interlocking features, such as ridges. The strands proximate the end of a cable are wetted with liquid potting compound. The wetted strands are then placed within the internal passage of the anchor. The potting compound then hardens to form a solid, thereby locking a length of strands into the anchor. The anchor, along with the contained strands and solid potting compound will be referred to as a "termination."

Those skilled in the art will know that the term "potting compound" generally refers to any liquid which can be transformed into a solid (such as by air-drying, cooling, reacting with a catalyst, etc.). Examples include thermoplastics, molten metals, thermosets, and reactive compounds (such as two-part epoxies).

Two methods of infusing liquid potting compound into the strands of a cable are in common use. These are: (1) Pulling an anchor into its final position around the exposed strands and pouring the liquid potting compound into an open end of the anchor; or (2) Infusing the exposed strands with liquid potting compound, then pulling the anchor into its final position (The infusion is typically accomplished via painting on the liquid potting compound or dipping the exposed strands into a vat of liquid potting compound).

Under either approach, the potting compound may fail to fully infuse the strands. Moreover, both approaches must generally be performed manually, resulting in drastic variations from termination to termination.

Figure 1:
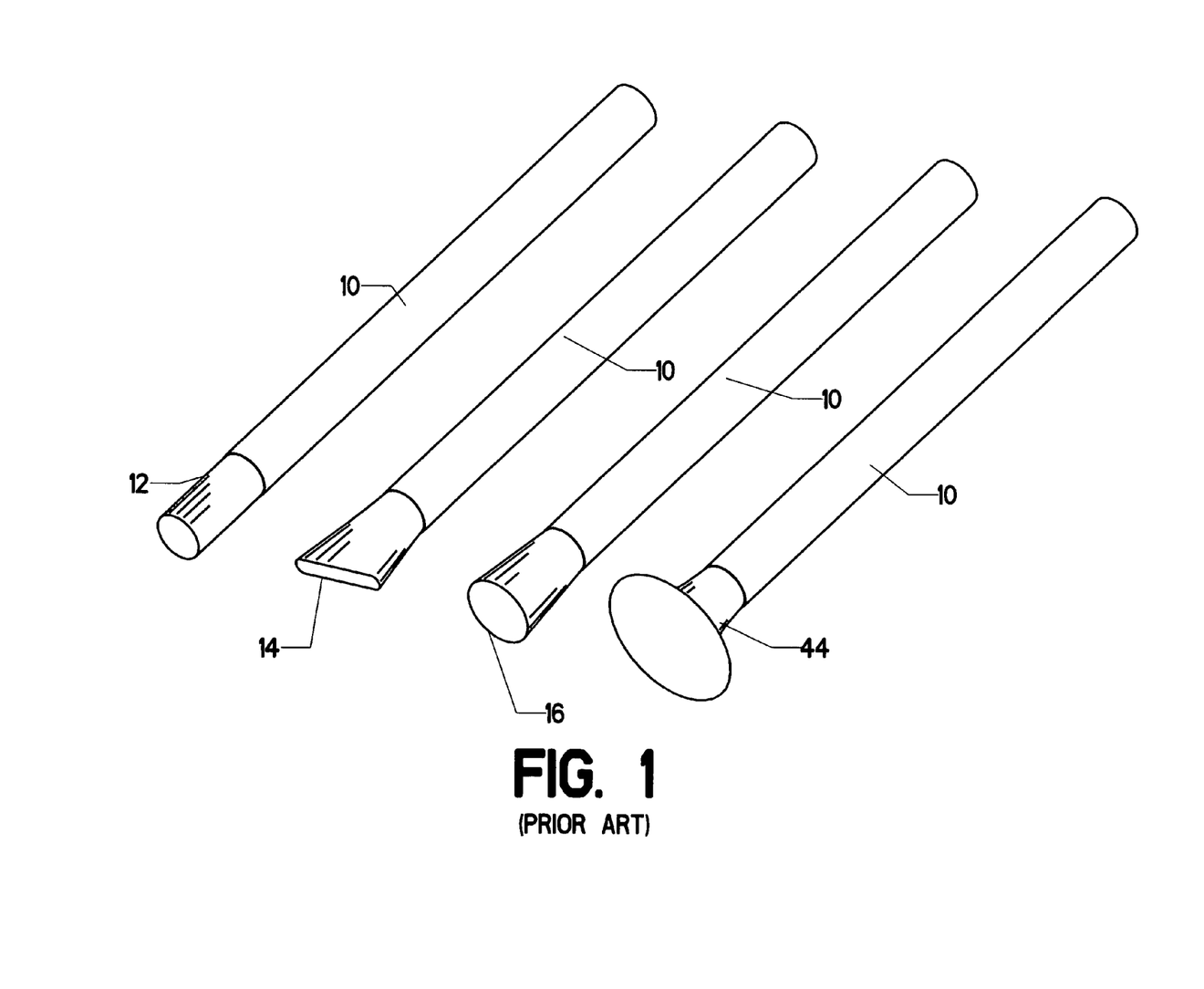
FIG. 1 is a perspective view, showing various cable strand configurations.

FIG. 1 shows four cables 10 with exposed strands in varying configurations. The far left example shows core strands 12 exposed and ready for potting in an undisturbed state. Proceeding to the right, the next example shows the exposed strands being compressed to form fanned strands 14. The next example shows the exposed strands being splayed to form conical strands 16. The far right example shows the strands being splayed apart further to form radially fanned strands 44. All these examples, as well as others, may be employed prior to infusing the exposed strands with liquid potting compound. However, as the infusion is carried out manually, all these methods are susceptible to unwanted inconsistencies. The present invention proposes a method for producing a consistent and repeatable cable termination.

BRIEF SUMMARY OF THE PRESENT INVENTION

The present invention comprises a process for forcibly infusing liquid potting compound into the exposed strands of a cable prior to forming a termination. The process uses an anchor as a containment around the strands, with the strands lying in a strand cavity within the anchor. A sealing body is used to seal the anchor's open end. Liquid potting compound is forced into the strand cavity where it runs around and through the exposed strands. A vent is preferably employed, so that the liquid potting compound flows through the strand cavity without trapping substantial air pockets. The liquid potting compound is allowed to harden while it remains in the strand cavity, thereby locking the anchor to the end of the cable. Alignment devices are provided to ensure that the cable is suitably aligned with the anchor during the potting process.

REFERENCE NUMERALS IN THE DRAWINGS

| 10 | cable | 12 | core strands |
|----|-------|----|--------------|
| 14 | fanned strands | 16 | conical strands |
| 18 | anchor | 24 | strand cavity |
| 44 | radially fanned strands | 46 | sealing body |
| 48 | needle | 50 | injection orifice |
| 52 | vent | 54 | dry strands |
| 58 | anchor end sealing surface | 60 | anchor holding fixture |
| 62 | cable holding fixture | 64 | anchor neck sealing surface |
| 66 | fixture sealing surface | 68 | anchor wedging surface |
| 70 | fixture wedging surface | 72 | gasket |
| 74 | sealing surface | 76 | open end |
| 78 | neck end | 80 | expandable gasket |
| 82 | injector manifold | 84 | injection port |
| 86 | injection annulus | | |

DETAILED DESCRIPTION OF THE INVENTION

Figure 2:
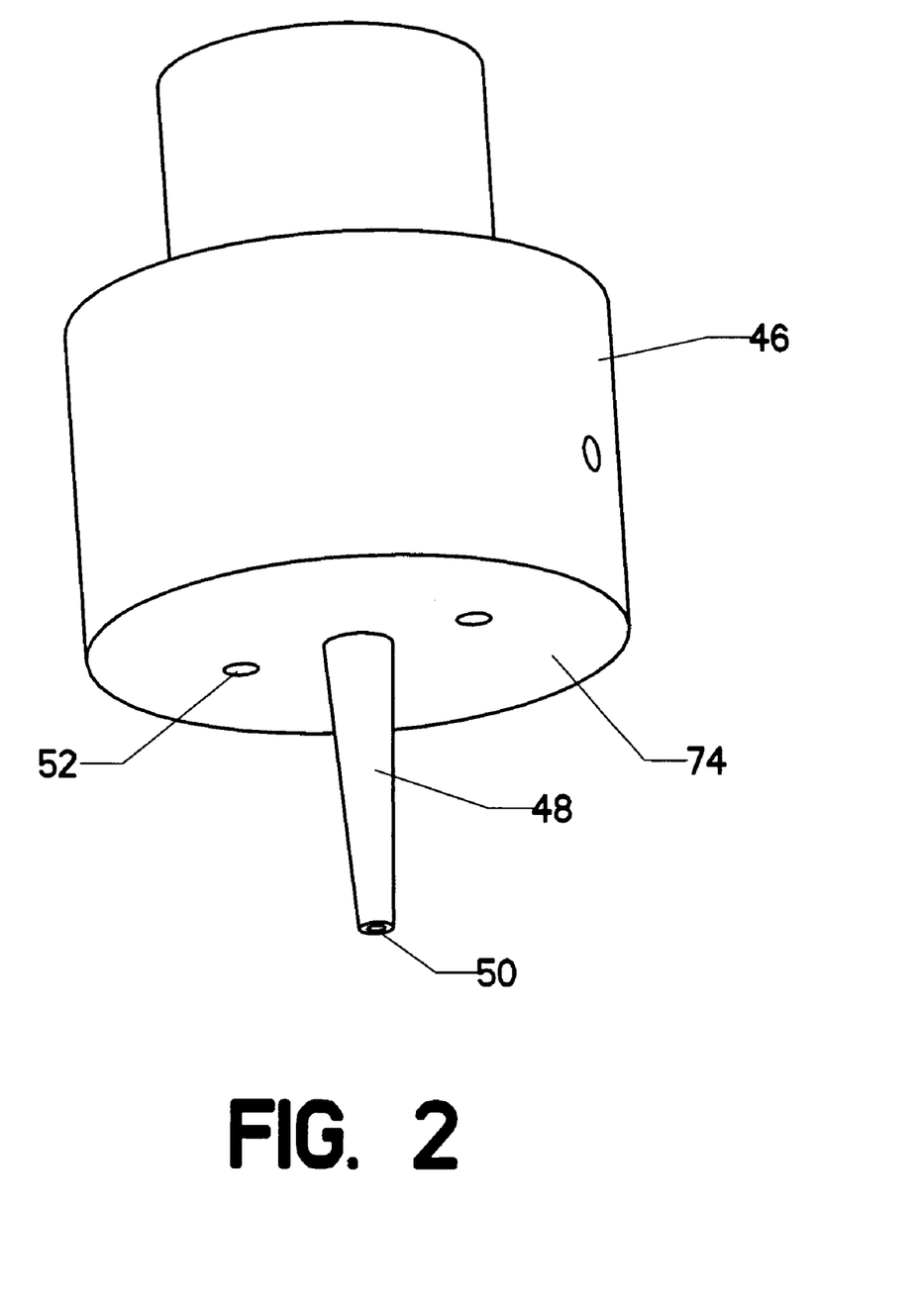
FIG. 2 is a perspective view, showing a sealing body including an injection orifice.

The present inventive method thoroughly and consistently infuses cable strands with liquid potting compound while they are positioned within a strand cavity in an anchor. FIGS. 2-5 illustrate the steps in this process. FIG. 2 shows sealing body 46. The sealing body is used to close off the open end of an anchor in order to form a complete containment into which liquid potting compound may be injected. Sealing surface 74 is configured to bear against and close off the open end of an anchor, as will be explained subsequently.

The sealing body may include other features, such as one or more injection orifices which may be located in a variety of positions. In the embodiment shown in FIG. 2, needle 48 extends from the injector's lower surface. Injection orifice 50 passes through needle 48 (The orifice can assume a variety of shapes). The term "needle" should be understood broadly to include any protrusion which allows injection orifice 50 to be located inside the volume of strands to be infused. The term "injection orifice" is used in the singular throughout this disclosure but it should be understood to encompass the possibility of two or more such orifices located in a variety of positions.

Figure 3:
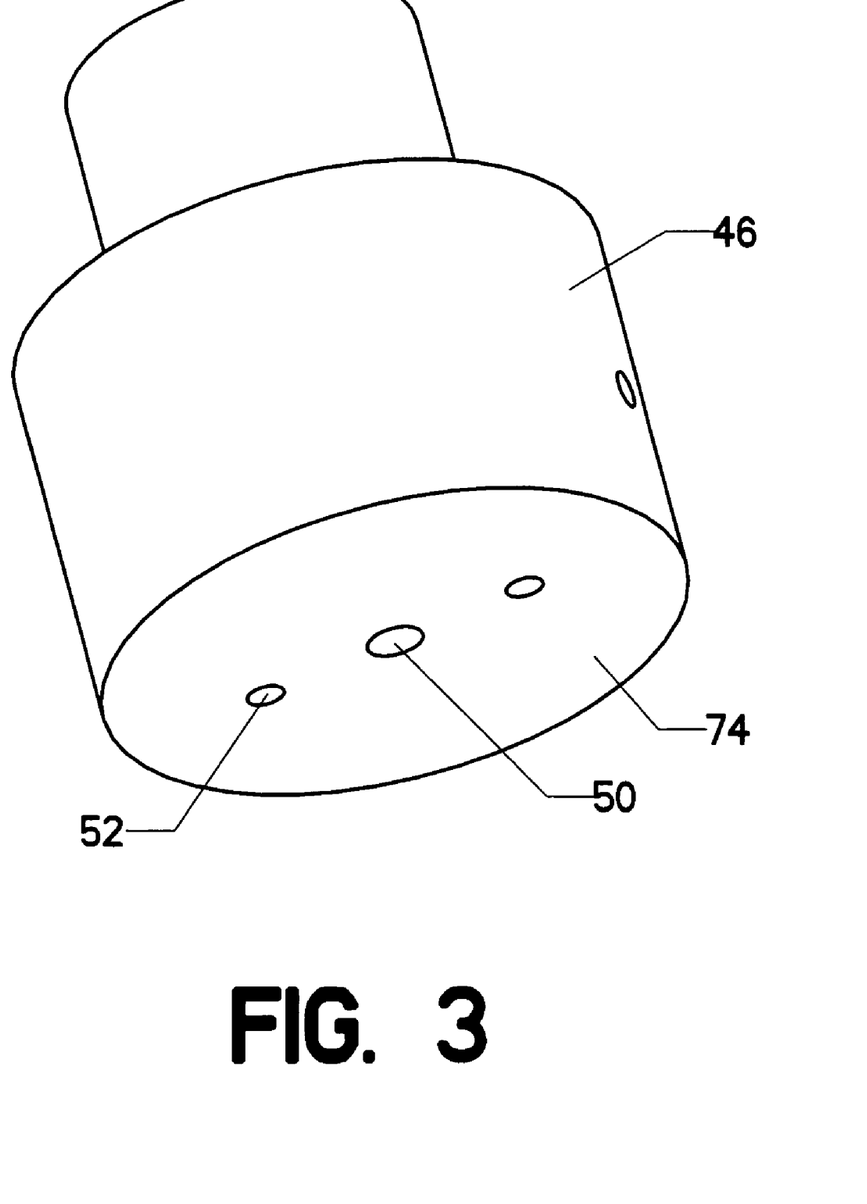
FIG. 3 is a perspective view, showing an alternate embodiment of the sealing body.

Sealing surface 74 of the embodiment shown in FIG. 2 opens into a pair of vents 52. These may connect to the surrounding atmosphere, or to a vacuum source. FIG. 3 shows a different type of sealing body 46 in which injection orifice 50 is provided on sealing surface 74 itself rather than on the end of a needle.

Figure 4:
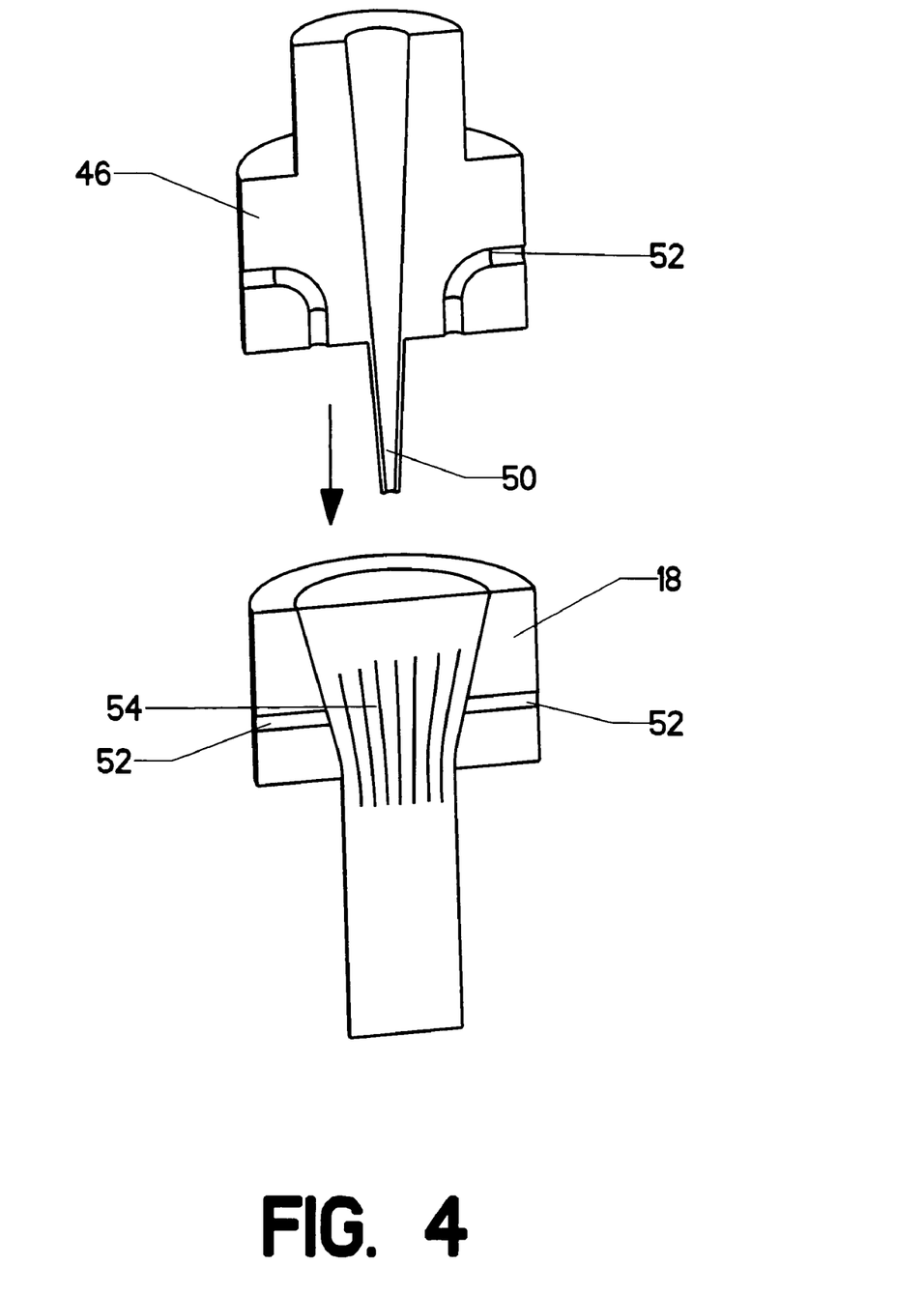
FIG. 4 is a sectional perspective view, showing the mating of the sealing body with the anchor.

FIG. 4 shows the sealing body embodiment in which a needle is included in a section view. Injection orifice 50 is connected to a supply of liquid potting compound (not shown). Vents 52 can be vented to the surrounding air or a collection or vacuum reservoir. Vents 52 may optionally be provided in the anchor as well (two vents through the anchor are shown in FIG. 4). In operation, the dry exposed strands 54 are placed within a strand cavity in an anchor 18. The strand cavity is an expanding internal passage which may assume many forms (The illustrated strand cavity is a simple linear taper but more complex curved shapes and/or interlocking features are also commonly used). The anchor has an open end facing the sealing body. Sealing body 46 is moved toward the exposed strands as indicated by the arrow.

Figure 5:
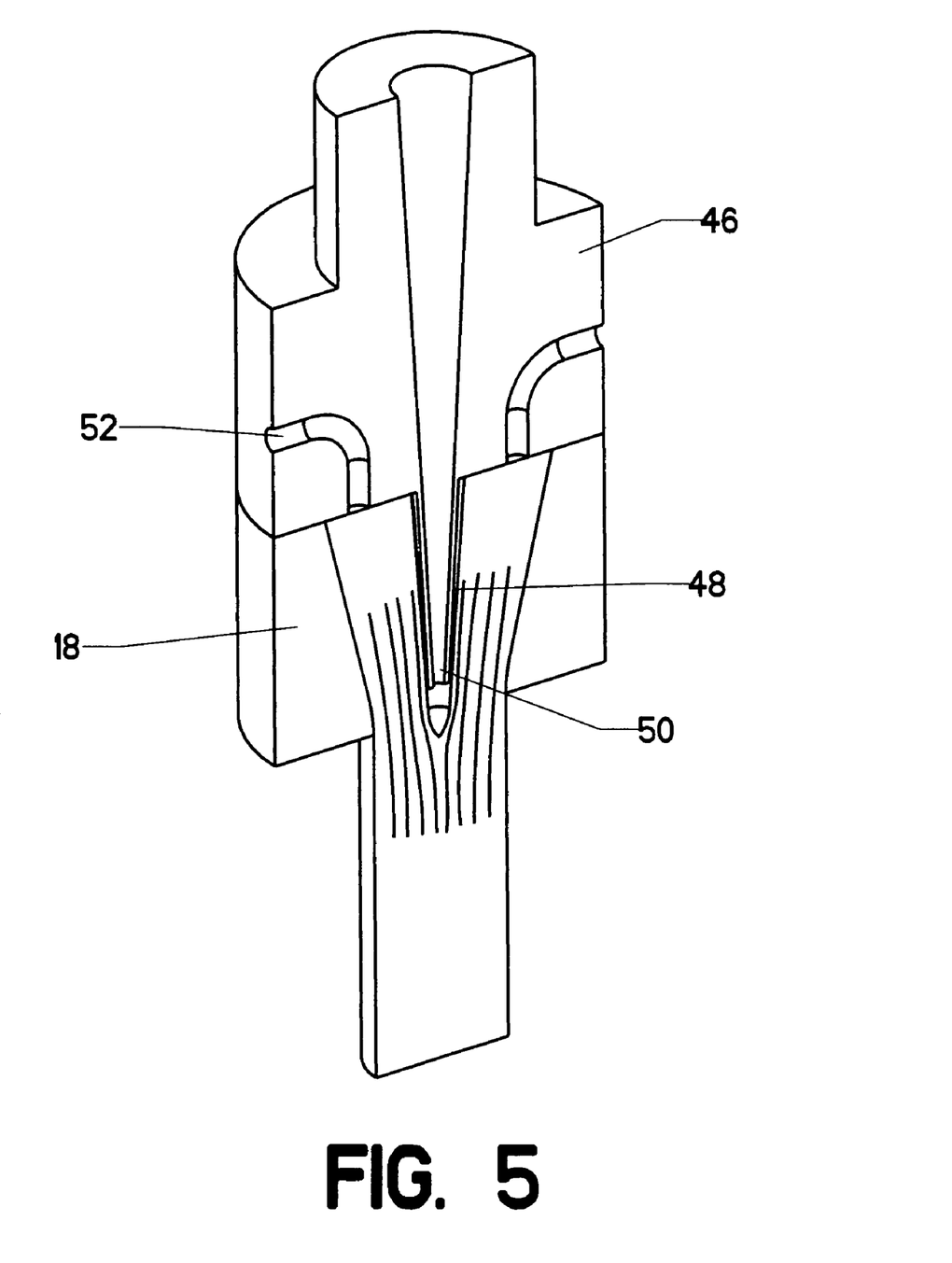
FIG. 5 is a sectional perspective view, showing the injection operation.

FIG. 5 shows sealing body 46 mated to anchor 18. The lower surface of sealing body 46 is actually mated against the upper surface of anchor 18 to form a seal. In this position, needle 48 protrudes down into the exposed strands. Liquid potting compound is then infused through injection orifice 50. The potting compound flows out through the strands toward the two vents 52, thereby completely infusing the strands within the anchor's internal passage. The flow of the liquid potting compound can be created in a variety of ways. One approach is to apply pressure to the potting compound being fed through injection orifice 50 while simply connecting the vents 52 to the ambient atmosphere. The flow rate can be increased by connecting the vents 52 to a vacuum source. Of course, the flow can also be created by leaving the potting compound supply at ambient pressure while connecting the vents to a stronger vacuum source (in effect "pulling" the potting compound into the strand cavity). Different approaches will be advantageous for different combinations of potting compounds and strand characteristics, and the inventive methods are by no means limited to a single approach.

The liquid potting compound is infused through substantially all of the volume within the strand cavity. The term "substantially all" is used because in many cases it will not be necessary to completely infuse the entire volume and in nearly all cases it is impossible to perfectly displace 100% of the air contained in the strand cavity. However, is desirable to infuse at least 50% of the volume within the strand cavity, preferably at least 75%, and even more preferably at least 90%.

Still referring to FIG. 5, the reader will observe that the strand cavity has a "neck end" and an "open end." The neck end is the lower portion of the strand cavity in the view—where the cable emerges from the anchor. The open end is the upper portion of the strand cavity in the view—the portion lying next to sealing body 46. Complete infusion of the strands is in many cases important in the neck end but less important when moving toward the open end. Thus, in some cases it will be possible to leave a portion of the strand cavity near the open end less than completely infused. In other more rare cases it will be desirable to leave a portion of the strands proximate the neck less than completely infused.

Once the infusion is completed, sealing body 46 is preferably withdrawn. The liquid potting compound then hardens to complete the termination. In some instances, however, it is possible to leave the needle and injection orifice in position as the potting compound hardens. It may be necessary to coat the external surfaces of the sealing body and needle with a release agent so that the potting compound does not adhere to them. The option of leaving the sealing body in place while the potting compound hardens can be done with a sealing body having a needle (as in FIG. 5) or with a sealing body having no needle (as in FIG. 3).

Those skilled in the art will realize that sealing body 46 can assume many forms, including breaking it into two or more pieces (like a mold). Incorporating needle 48 into the sealing body is optional. The injection could be accomplished via forcing the liquid potting compound through a simple hole (such as in the alternate embodiment shown in FIG. 3). Likewise, the seal between sealing body 46 and anchor 18 can be achieved using many methods, including the use of a gasket or interlocking threads. With the anchor itself forming the mold, it may also be advisable in some embodiments to add infeed runners or vents to the anchor itself. These features could take many shapes.

In performing the potting process whereby the cable strands are locked within the strand cavity, it is important that the cable be aligned with the anchor. The cable has a central axis and the anchor will generally have a central axis as well (assuming that it is a radially symmetric anchor). There are two important types of alignment in creating a consistent and repeatable termination. The first type is "lateral alignment"—which means ensuring that the central axis of the cable is concentric with the central axis of the anchor. Any lateral misalignment may produce undesirable properties. One example of an undesirable property is that some of the strands may have a shorter overall length than others. When the cable is then placed under tension, the shorter strands will carry a disproportionally large share of the load and the termination will not perform as well as it could.

The second type of alignment is "longitudinal alignment." Referring to FIG. 4, the reader will observe that the cable is free to slide along the central axis of the anchor. In other words, one could push the anchor further down the cable so that dry strands 54 extend out the open end of the strand cavity. Alternatively, one can pull the anchor upwards with respect to the cable so that the strands do not reach the open end of the strand cavity. The variation in longitudinal position between the cable and the anchor is referred to as longitudinal alignment. Keeping this value consistent is important to creating a consistent termination.

Thus, the reader will understand that it is advantageous to ensure both lateral and longitudinal alignment of the anchor and the cable during the termination process. In some instances only one of the two forms of alignment will be important, but generally both are important.

Those familiar with synthetic cables will realize that ensuring the alignment of the cable and the anchor is difficult because synthetic cables have very fine strands and the cables do not tend to be very stiff. The strands also tend to be slick. Where an older cable such as wire rope will tend to retain its position because of its inherent rigidity, a synthetic cable will deflect substantially under its own weight. Thus, the use of alignment fixturing can be a significant advantage.

Figure 6:
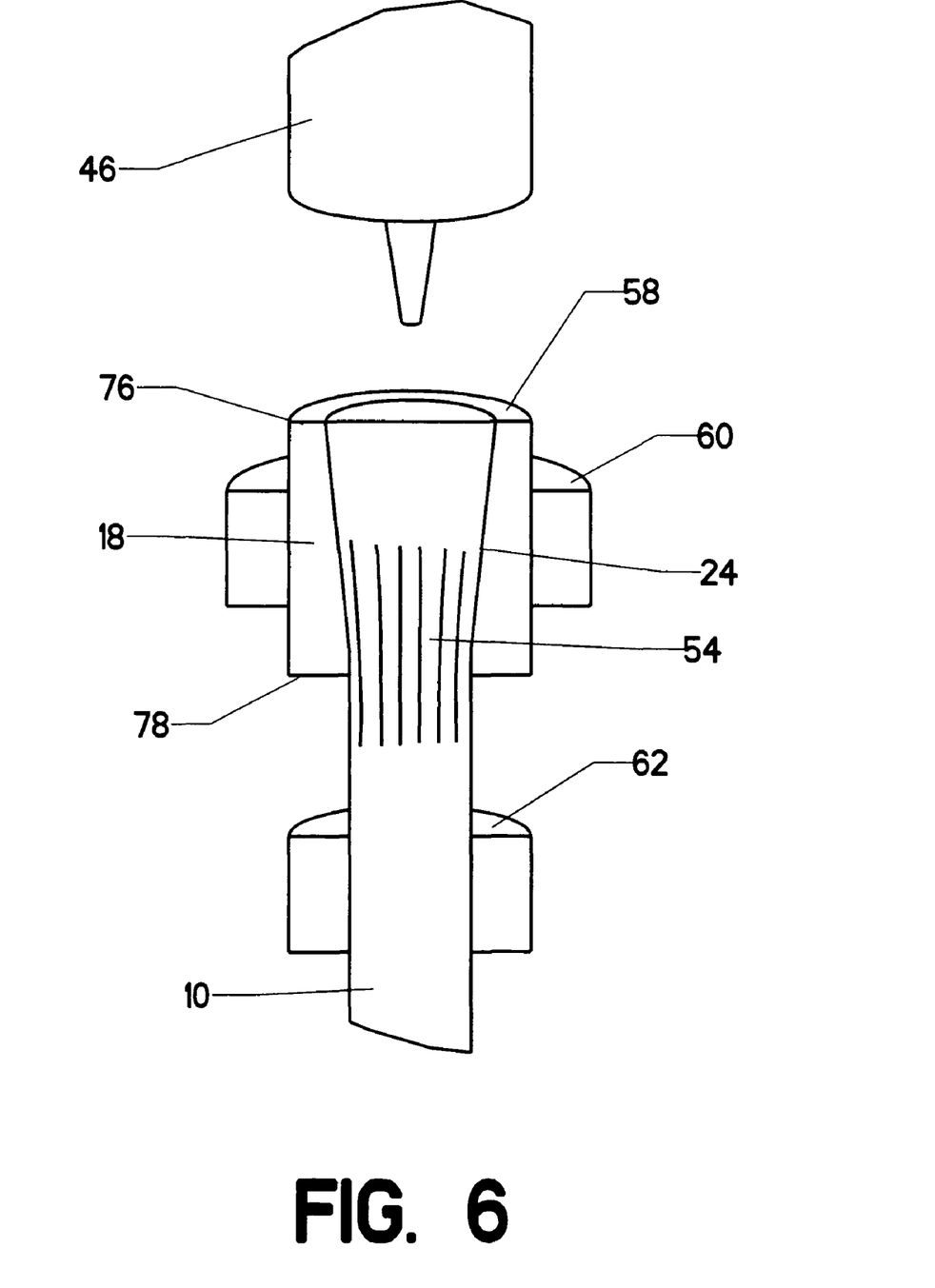
FIG. 6 is a sectional perspective view, showing the use of alignment fixtures on the cable and the anchor.

FIG. 6 shows a solution to the alignment issue. This figure shows a sectioned elevation view through a cable undergoing the potting process. Dry strands 54 on the end of the cable have been placed within strand cavity 24. In this case the strand cavity is actually an expanding passage within anchor 18. Anchor 18 has open end 76 and neck end 78 (The "neck end" being the side where the freely flexing portion of the cable emerges from the anchor through the "neck" of the strand cavity). Strand cavity 24 passes through anchor 18 from neck end 78 to open end 76. The strand cavity preferably has an expanding cross section.

Anchor 18 is placed within anchor holding fixture 60. The anchor holding fixture can assume a virtually limitless variety of forms, but it should hold the anchor securely and keep it in a desired orientation during the process. One example of an anchor holding fixture is a split fixture that is clamped together around the anchor.

Cable 10 is held in position by cable holding fixture 62. The cable holding fixture is aligned with the anchor holding fixture so that the cable is held in the appropriate position with respect to the anchor (in terms of lateral alignment and/or longitudinal alignment). The cable holding fixture can also assume many different forms, with a split collar being one example. It may also be desirable in some applications to employ a lengthened cable holding fixture that grips a substantial length of the cable, since synthetic cable strands and/or jackets may be relatively slick. Multiple cable holding fixtures can also be used. The devices used to align the cable holding fixture with the anchor holding fixture are not illustrated, but these will be readily visualized by those skilled in the art. As one example, both the cable holding fixture and the anchor holding fixture may be secured to a fixed jig to ensure proper alignment. Those skilled in the art will also realize that the cable holding fixture and the anchor holding fixture can both be part of the same device.

Once the cable is properly referenced to the anchor using the holding fixtures, sealing body 46 is mated to anchor end sealing surface 58 and the liquid potting compound is infused into the dry strands as described previously. The two holding fixtures are preferably left in position while the potting compound hardens so that the proper alignment is maintained. After the potting compound has hardened, the two holding fixtures are removed. Thus, the holding fixtures preferably ensure alignment until the time when the potting compound has hardened and the cable is secured to the anchor. However, there will be instances where it is permissible to remove one or more of the holding fixtures before the curing process is complete and these embodiments should be understood to lie within the present inventive process.

The potting compound injection process is best carried out by retaining the liquid compound within the anchor. Unfortunately, some of the liquid potting compound often tends to leak out the neck end of the anchor. This portion will then harden in the cable strands lying outside the anchor, causing localized stress concentrations when the cable flexes, as well as other problems.

Figure 7:
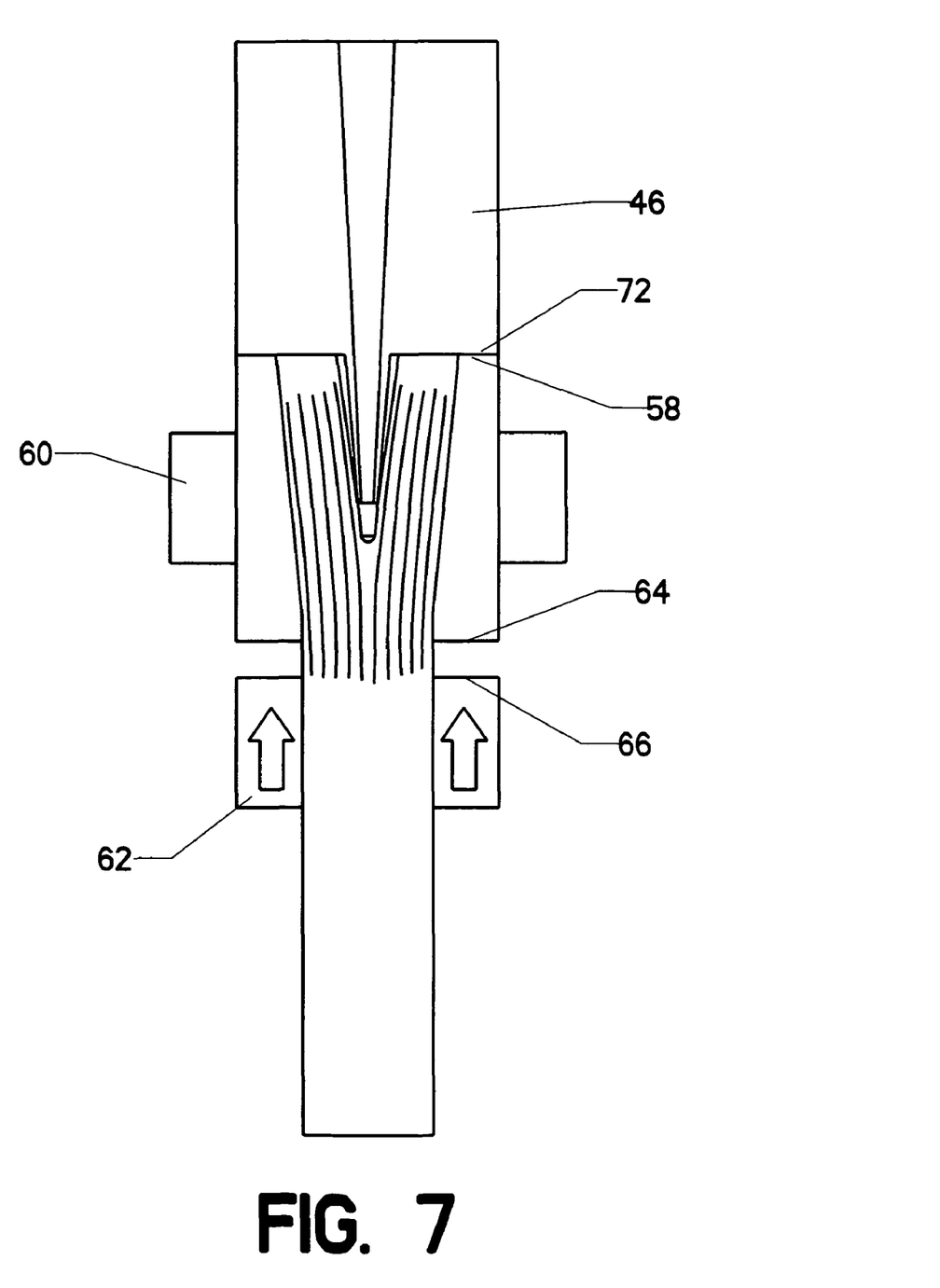
FIG. 7 is a sectional elevation view, showing the operation of the alignment fixtures.

FIG. 7 shows a solution to this problem. The neck end of the anchor is provided with anchor neck sealing surface 64. A fixture sealing surface 66 is mated to anchor neck sealing surface 64 in order to seal the neck end of the anchor. Fixture sealing surface 64 may be located on a separate component or may actually be provided on cable holding fixture 62.

Sealing surface 72 on sealing body 46 has been mated to anchor end sealing surface on anchor 18—thereby sealing the open end of the anchor. Fixture sealing surface 66 has been mated to anchor neck sealing surface 64 on the neck end of the anchor—thereby sealing the anchor's neck end. The liquid potting compound is then injected by the injector and it floods the strand cavity. The air within the strand cavity is forced out and replaced with liquid potting compound (though a few relatively small air pockets are always likely to remain).

Figure 8:
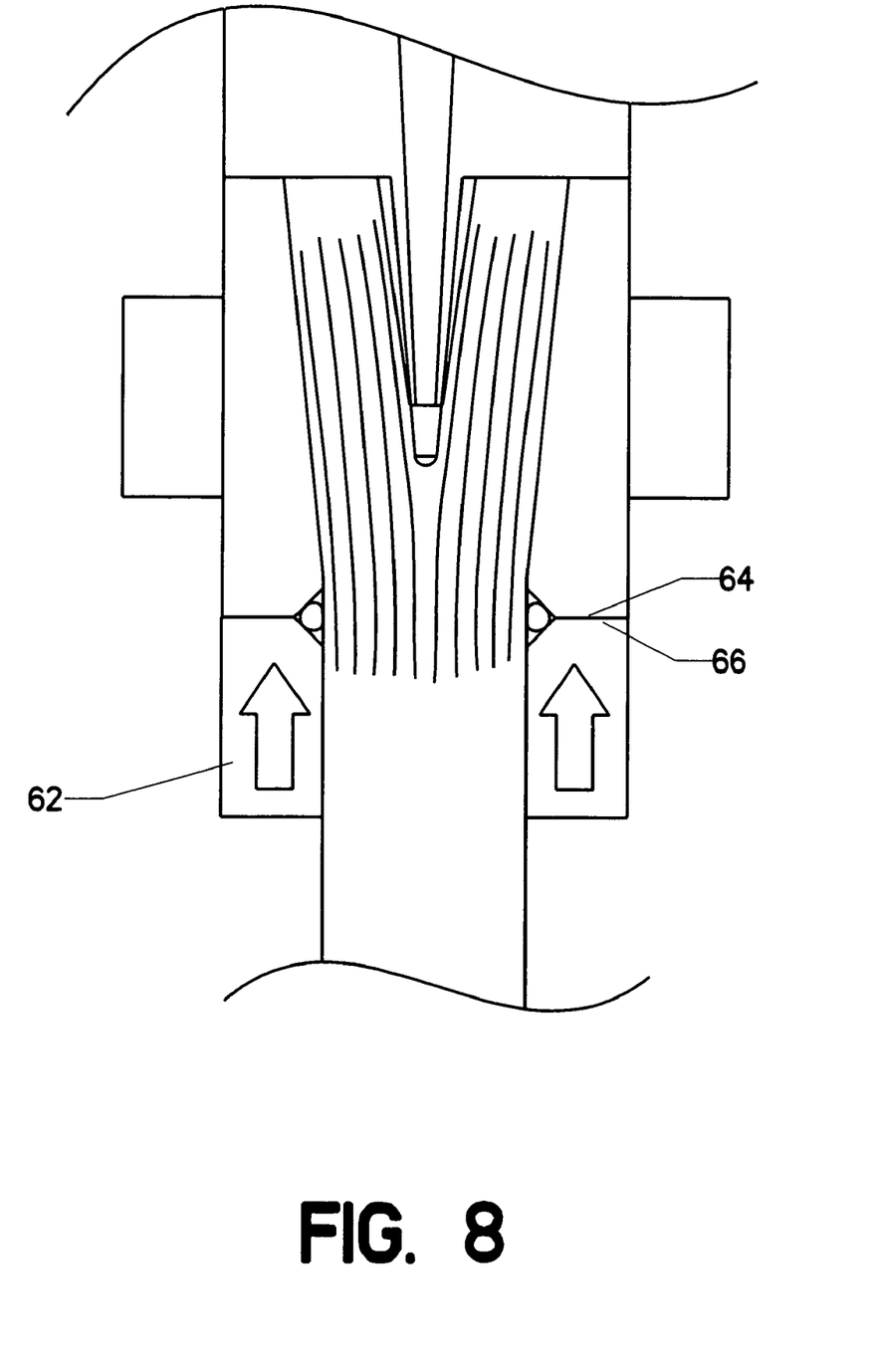
FIG. 8 is a sectional elevation view, showing the use of a gasket to seal the anchor's lower surface.
Figure 9:
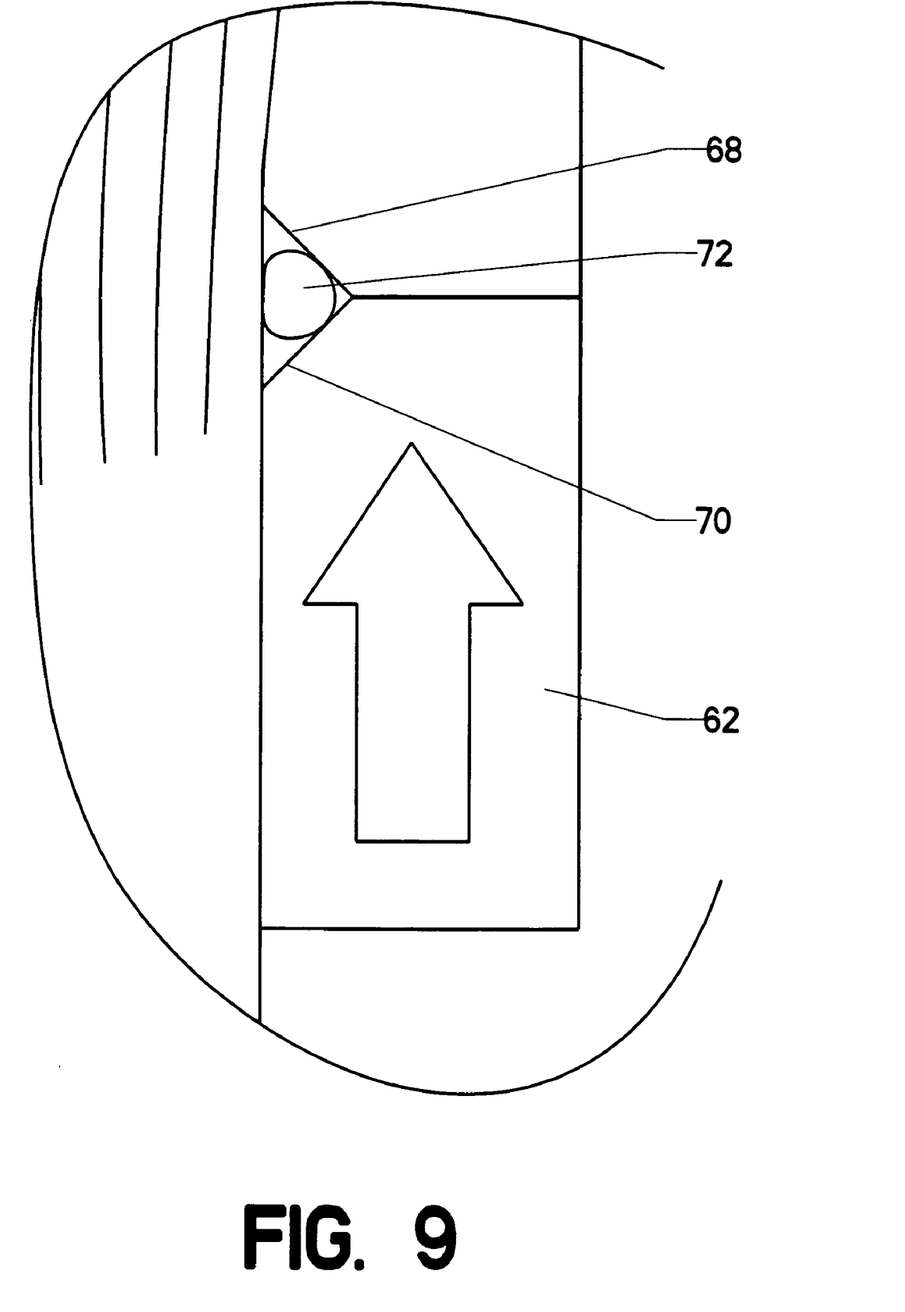
FIG. 9 is a detailed elevation view, showing the gasket seal in more detail.

FIGS. 8 and 9 illustrate a further refinement. It is preferable to compress the cable strands in an inward direction near the point where the strands emerge from the neck end of the anchor. This action bunches the strands more tightly together and tends to prevent leakage of the liquid potting compound between the strands. FIG. 8 shows an embodiment in which the neck end of the anchor and the opposing surface on the cable holding fixture are provided with a sealing gasket.

FIG. 9 shows this configuration in more detail. Anchor wedging surface 68 is provided in anchor neck sealing surface 64. An opposing fixture wedging surface 70 is provided in fixture sealing surface 66 (which may or may not be part of the cable holding fixture). Gasket 72 is shown in position between the two opposing wedging surface. When the anchor neck sealing surface and the fixture sealing surface are pressed toward each other, Gasket 72 is forced inward and upward, suitably compressing the cable strands. Once the potting compound has hardened (or in some cases before it has hardened but after the infusion process), the gasket can be removed or left in place. Although a gasket having a round cross section is shown, other shapes could be substituted and the term "gasket" should not be understood to be limited to any particular cross section. The reader should also note that this configuration will work with only one wedging surface opposing a flat surface on the other component (rather than two wedging surfaces). The wedging surfaces are shown as simple chamfers, but they may also assume the form of fillets or other shapes.

Figure 10:
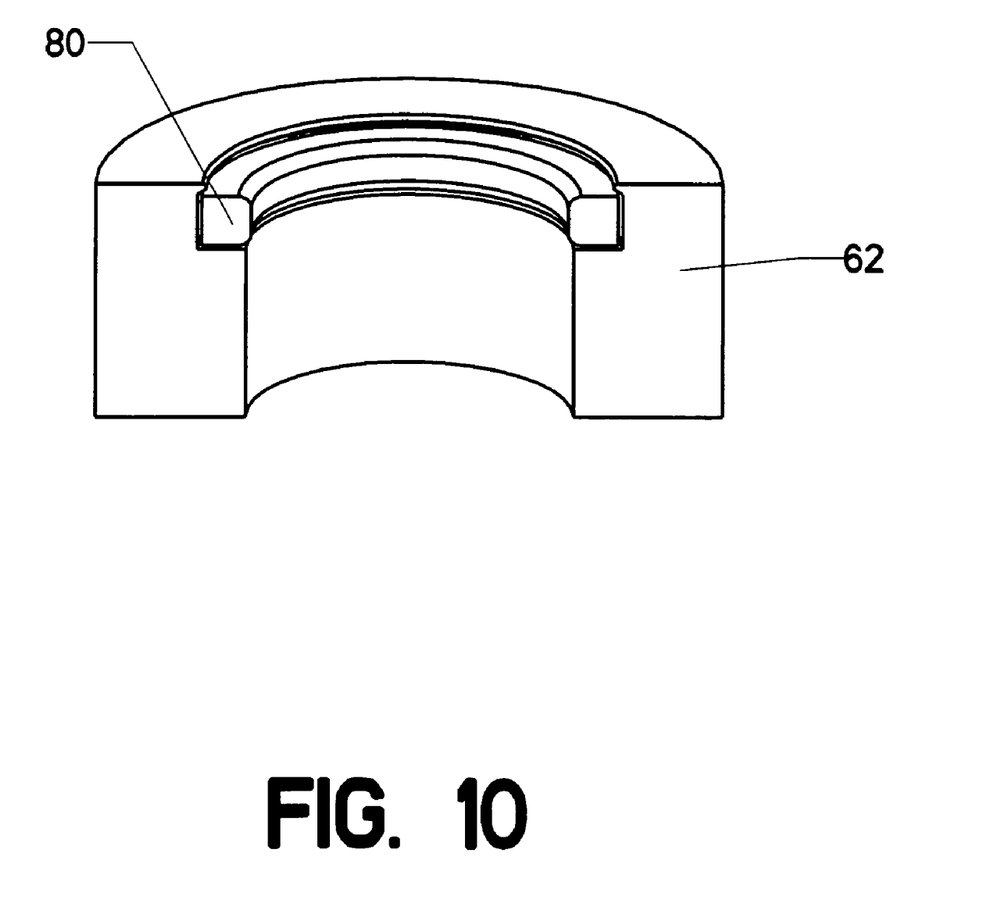
FIG. 10 is a sectional perspective view, showing the use of an expandable gasket seal.

Other more sophisticated seals may be used in place of a passive gasket. FIG. 10 shows another embodiment in which cable holding fixture 62 is equipped with expandable gasket 80. The view shows one-half of a pair of cable holding fixtures which are configured to be clamped around the cable. An expanding mechanism—such as gas pressure—is applied to expand the expandable gasket and seal the cable near the position where it emerges from the neck end of the boundary.

Many other seals are possible and the inventive method is by no means limited to any particular approach. As one additional example, a thin collar could be provided on the anchor's neck end (either as part of the anchor or as a separate piece). Once the cable is placed in the proper position, this thin collar can be swaged around the cable to form a seal and to ensure the proper alignment. All these approaches may generally be referred to as providing a neck seal.

Figure 11:
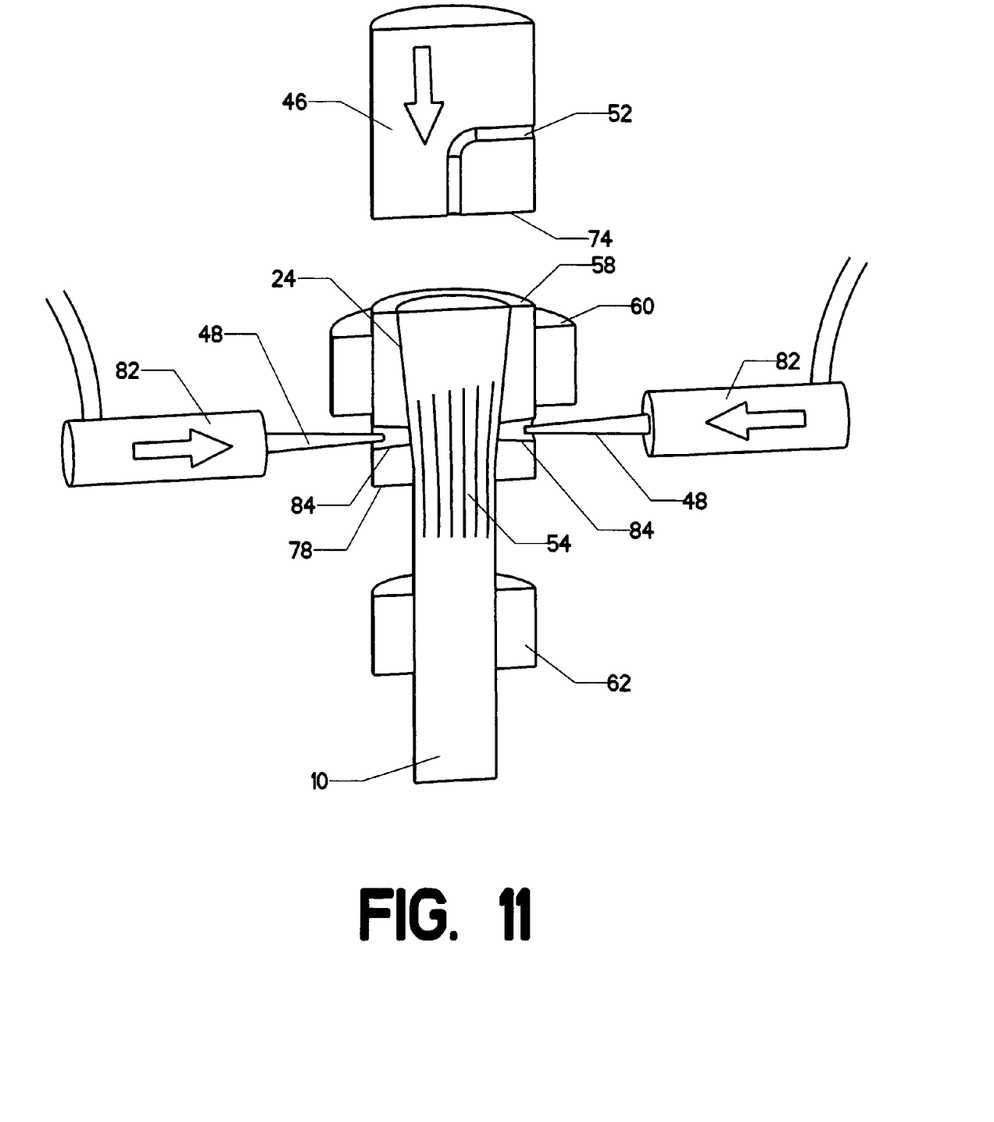
FIG. 11 is a sectional perspective view, showing an alternate injection method.

The injection of the liquid potting compound will often be made through the open end of the anchor, as depicted in FIG. 6. However, the potting compound may be injected in other locations as well. FIG. 11 shows an alternate embodiment in which two injection ports 84 have been added to the anchor (The anchor and cable have been sectioned in half to aid visualization). Each of these ports passes from the anchor's exterior into strand cavity 24. A pair of injection manifolds 82—each having a needle 48 including an injection orifice 50—are positioned to be inserted into the injection ports. The two injection manifolds move inward as shown by the arrows.

The provision of the needles 48 on the injection manifolds is purely optional. The injection manifolds could be designed to mate directly with the outer extremes of the two injection ports 84 and the injection ports themselves would then replace the needles. Flats could be provided on the exterior of the anchor where the injection ports emerge, thereby making it easier to seal the injection manifolds against the anchor. Sealing gaskets could be provided to enhance the seal. Alternatively, mechanical pressure between the injection manifold and the anchor could be used to form an effective seal (analogous to the "gasketless" seal created between the mating portions of a thermoplastic injection mold). Numerous other possibilities will be apparent to those skilled in the art.

Air trapped within the strand cavity will generally be forced out the top. In order to ensure a regulated flow it is preferable to provide sealing body 46 (shown sectioned in half so that its interior may be seen). In this embodiment, sealing body 46 includes a vent 52. Sealing surface 74 on sealing body 46 is clamped against anchor end sealing surface 58. The injector needles (or the anchor) are preferably provided with gaskets or other sealing interfaces so that they seal against the anchor before the injection cycle begins. Using this assembly, liquid potting compound is injected into the dry strands. It will then tend to flow toward vent 52 in a predictable fashion. More vents may be provided in the sealing body or other locations. As for the prior examples, combinations of pressure and vacuum (or either acting individually) can be applied to create the desired flow.

The flow may be regulated by varying the injection pressure and varying the flow through the vent(s). A vent may be turned on and off, or may even be throttled by a regulating valve. As one example—an embodiment could be provided in which a set of vents are provided in the middle portion of the strand cavity and a set of vents are provided in the sealing body. When the injection process begins, only the vents in the sealing body would be opened in order to ensure that the potting compound travels from the neck end of the strand cavity to the open end. The vents in the middle of the strand cavity could then be opened to ensure that the potting compound flows outward toward the boundaries of the strand cavity.

Figure 12:
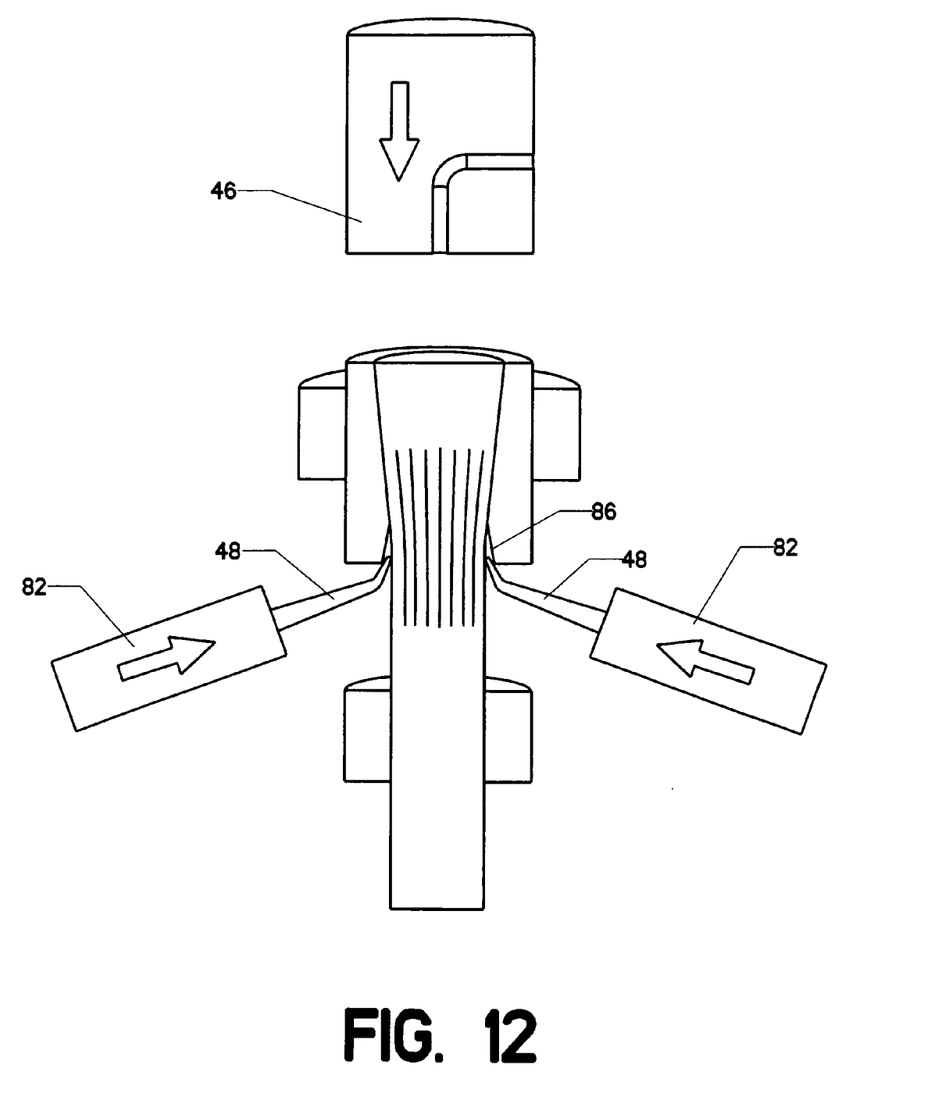
FIG. 12 is a sectional perspective view, showing an alternate injection method.

The injection of the liquid potting compound may be provided at other locations as well. FIG. 12 shows still another embodiment in which the anchor is provided with injection annulus 86 proximate its neck end (a ring shaped cavity proximate the neck end of the anchor). One or more injection manifolds 82 are again provided. The tips of the needles 48 are preferably canted in order to make their introduction into the injection annulus easier. Each needle includes at least one injection orifice. As for the prior example, sealing body 46 is mated to the open end of the injector in order to enclose the strand cavity. The liquid potting compound is then introduced. The injection annulus is a form of injection port proximate the anchor's neck end. Multiple conventional ports in a radial array could be substituted for the injection annulus. A single canted port could also be used, though obviously this would likely be less efficient.

Figure 13:
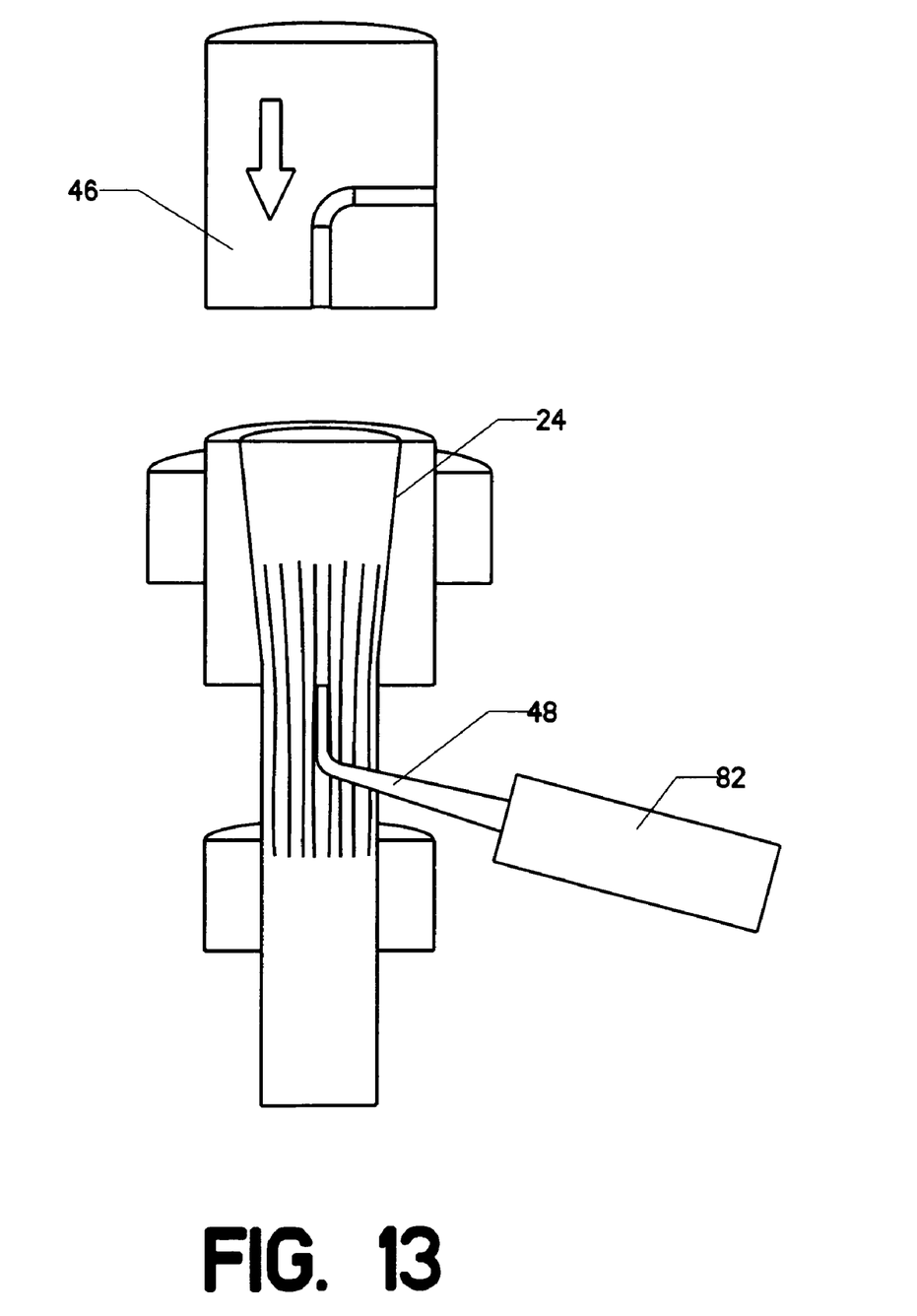
FIG. 13 is a sectional perspective view, showing an alternate injection method.

It is also possible to provide a needle which can be introduced into the interior of the bundle of strands. FIG. 13 shows this embodiment. This needle 48 is preferably angled or otherwise configured so that it can be inserted into the bundle of strands. An injection orifice is provided at its tip. The needle is manipulated so that the tip lies near the center of the strand bundle and within strand cavity 24. Sealing body 46 is mated to the open end of the anchor in order to seal strand cavity 24. The liquid potting compound is then introduced through the needle and flows toward the vent in the sealing body.

The reader should understand that the term "vent" is intended to encompass any device which would allow the escape of air from the strand cavity during the infusion process. The vents in the illustrated embodiments have been simple ports, but other examples are known to those skilled in the art. Returning to FIG. 12, it is possible to use a relief like injection annulus 86 as a vent. One possibility for this embodiment would be injecting the liquid potting compound through sealing body 46 (as in FIG. 4) and venting through a vent arrangement proximate the neck (such an injection annulus 86).

The cable strands themselves may also serve as a vent. The use of sealing body 46 allows the creation of positive pressure within the strand cavity. If liquid potting compound is then infused into the strand cavity escaping air will tend to escape through the space within the cable strands out the neck end of the strand cavity. This phenomenon may be more precisely controlled by providing a vent inside the cable strands themselves. Turning now to FIG. 13, needle 48 may be used as a vent instead of an injection orifice. The injection orifice can then be located in another place (such as the anchor wall or in the sealing body). In some instances it may be desirable to provide an array of such vents within the cable itself.

A vent or vents can also be placed within the strand cavity by placing a vent on the end of a needle (a "venting needle") and projecting this needle into the strand cavity during the injection process. The venting needle could remain in position or it could be withdrawn in a controlled fashion as the liquid potting compound infuses the strands.

The reader will thereby appreciate how the additional components and steps described can ensure the proper alignment of the cable and the anchor as the potting compound transitions to a solid. The reader will also appreciate how the sealing features and methods help contain the potting compound within the anchor.

Throughout the preceding disclosure, terms referring to the orientation of the parts have been used ("upper", "lower", etc.). Those skilled in the art will realize that the orientation of the components has no significant impact on the operation of the devices. These terms referred only to the orientations shown in the views, and should not be taken as limiting the scope of the invention.

Although the preceding description contains significant detail, it should not be construed as limiting the scope of the invention but rather as providing illustrations of the preferred embodiments of the invention. Thus, the scope of the invention should be fixed solely by the language in the claims that follow.

The invention claimed is:

1. A method for attaching an anchor to a cable, comprising:
   a. providing an anchor having a neck end, an open end, and a strand cavity passing through said anchor from said neck end to said open end;
   b. providing a cable including a plurality of strands and a free end;
   c. placing said plurality of strands of said cable within said strand cavity of said anchor, so that said free end of said cable lies proximate said open end of said anchor;
   d. providing an anchor holding fixture;
   e. attaching said anchor having said placed plurality of strands therein to said anchor holding fixture;
   f. providing a cable holding fixture;
   g. attaching said cable to said cable holding fixture;
   h. aligning said cable holding fixture having said cable attached thereto and said anchor holding fixture having said anchor attached thereto;
   i. providing an anchor sealing surface on said open end of said anchor;
   j. providing a sealing body;
   k. after said plurality of strands of said cable are placed within said strand cavity in said anchor, mating said sealing body with said anchor sealing surface;
   l. providing an injection orifice in either said anchor or said sealing body;
   m. providing a potting compound which transitions from a liquid state to a solid state over time;
   n. injecting said potting compound, in said liquid state, through said injection orifice and into said strand cavity, so that said liquid potting compound infuses throughout substantially all of said strand cavity and said plurality of strands lying therein; and
   o. allowing said liquid potting compound injected into said strand cavity to harden into a solid, thereby locking said plurality of strands lying within said strand cavity to said anchor.

2. A method for attaching an anchor to a cable as recited in claim 1, further comprising:
   a. providing at least one injection port in said anchor;
   b. connecting said injection orifice to said at least one injection port; and
   c. injecting said liquid potting compound through said injection port and into said strand cavity.

3. A method for attaching an anchor to a cable as recited in claim 2, further comprising providing at least one vent connected to said strand cavity.

4. A method for attaching an anchor to a cable as recited in claim 3, further comprising applying a vacuum to said at least one vent.

5. A method for attaching an anchor to a cable as recited in claim 3, wherein said at least one vent is located in said sealing body.

6. A method for attaching an anchor to a cable as recited in claim 3, wherein said at least one vent is located in said anchor.

7. A method for attaching an anchor to a cable as recited in claim 2, further comprising providing a neck seal to seal said neck end of said anchor while said liquid potting compound is being injected.

* * * * *